June 8, 1943.　　　　　K. E. BEMIS　　　　　2,321,173
APPARATUS FOR MAKING SEMIFROZEN CONFECTIONS
Filed Nov. 10, 1941
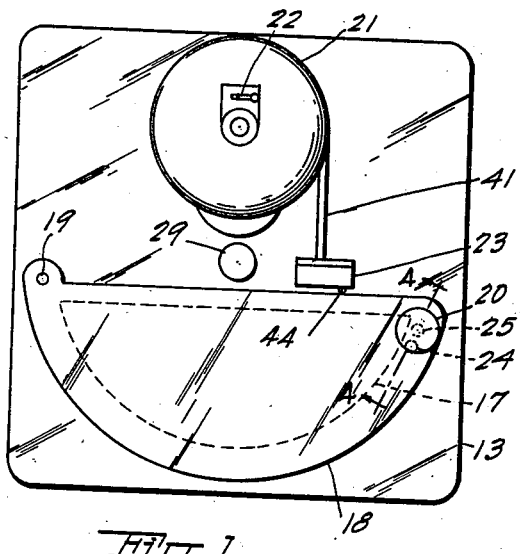
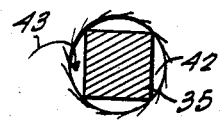
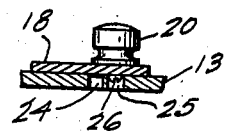
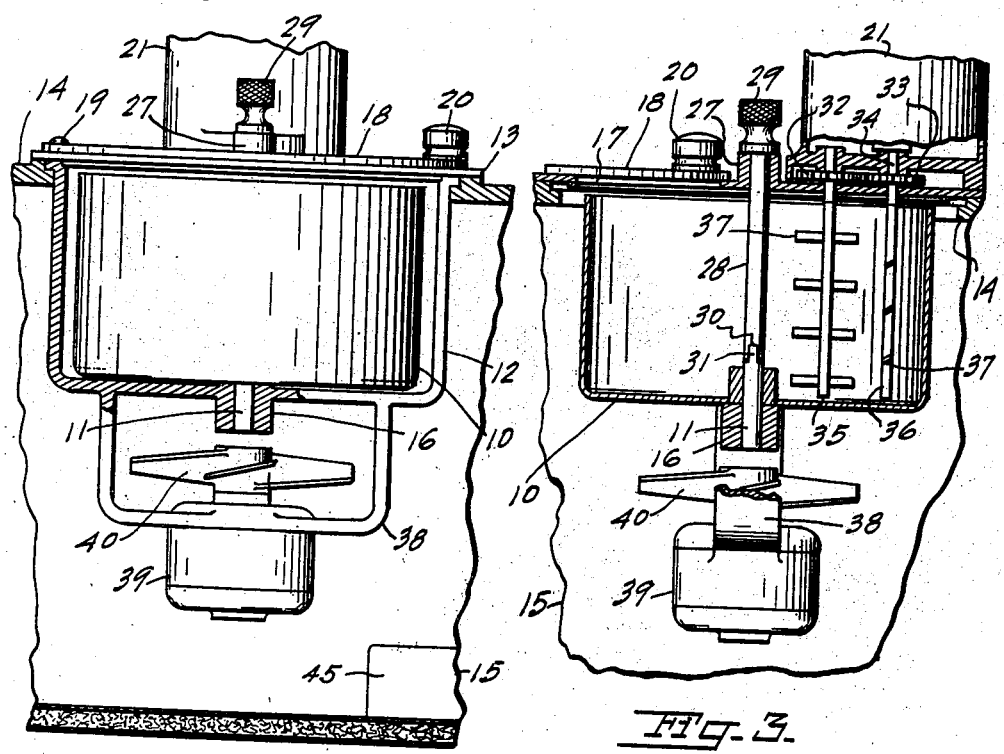
Inventor
Kenneth E. Bemis
By Philip A. Friedell
Attorney Patented June 8, 1943

2,321,173

UNITED STATES PATENT OFFICE 2,321,173

APPARATUS FOR MAKING SEMIFROZEN CONFECTIONS

Kenneth E. Bemis, Oakland, Calif.

Application November 10, 1941, Serial No. 418,522

4 Claims. (Cl. 62—114)

This invention relates to apparatus for breaking down frozen confections and converting them to a substantially semi-fluid state, such as the conversion of normal stiffly-frozen ice cream into what is commonly called "soft ice cream," and is also adapted for making semi-frozen drinks and edibles, such as malted milks and similar products.

As is well known, ice cream is conventionally served in a stiffly frozen condition, with the temperature considerably below the freezing point of the mixture. Likewise, the demand for soft ice cream is constantly increasing. The most delectable malted milks and ice creams and sherbets are those which are in a semi-frozen condition, about half way between a solid and liquid state.

The reason for the constantly increasing demand for soft ice cream is attributable to the fact that the taste buds on the tongue become less and less active as the temperature of a food is decreased and become practically dormant under exceptional or prolonged application of severe cold, therefore the soft ice-cream affects the taste buds to a far greater extent and thereby the taste is considerably enhanced, while the ice cream still retains the necessary coldness to provide its invigorating and thirst quenching properties. With the stiff variety of ice cream, the tongue is compelled to give up so much of its heat that the sense of taste is practically dormant and therefore the true and delicious flavor of the ice cream is not recognized.

The objects and advantages of the invention are as follows:

First; to provide apparatus which will efficiently convert stiffly frozen ice cream into a soft or semi-liquid product.

Second; to provide apparatus which will produce malted milks and other similar products of a semi-frozen consistency.

Third; to provide apparatus of the type outlined which will introduce air into the product while converting the material into a semi-frozen product.

Fourth; to provide a method in which a stiffly frozen product is converted into a semi-liquid product and maintainable in that condition.

Fifth; to provide an apparatus as outlined which can be conveniently installed in a conventional refrigerated cabinet.

Sixth; to provide apparatus as outlined which will subject the product to the ordinary temperature prevailing in the upper zone of a refrigerated space while the product is in a semi-liquid state, and to provide means for circulating the colder fluid from the lower zone about the apparatus when the fluidity of the product is increased.

In describing the invention reference will be made to the accompanying drawing, in which:

Fig. 1 is a top plan view of the invention.

Fig. 2 is a front elevation of the invention shown mounted in a refrigerated cabinet and partly shown in section.

Fig. 3 is a side sectional elevation of Fig. 2.

Fig. 4 is a section taken on line 4—4 of Fig. 1.

Fig. 5 is a cross section taken through one of the beater shafts and illustrates the means for introducing air into the product.

The invention includes a container 10 having an axial pivot 11. This container is supported in the cradle 12 which is supported preferably independently of the main cover 13 which covers the opening in the top 14 of the refrigerating cabinet 15, though the cradle may also be releasably supported by this main cover 13 which coincidently functions as the base of the apparatus. In either case, the container is removable at will for cleaning. A hub 16 has a bore which rotatably receives the pivot 11 of the container which is thereby supported on a vertical axis, the container being supported on the top surface of this hub and being freely rotatable.

The main cover 13 of the apparatus has an opening 17, and a sliding or other suitably operated container cover 18 is provided for closing this opening. This container cover is shown as pivoted at 19 and having a knob 20 for convenient manipulation of the cover. A motor 21 is mounted on the rear portion of the main cover 13, and a first switch 22 is shown mounted on the upper portion of this motor. A second switch 23 is mounted in cooperative relation to the cover 18 and controls operation of the motor. The top 13 has two recesses 24 and 25 for selective reception of a latching or retaining device such as a knob or screw head 26, the cover 18 closing the opening 17 irrespective of which of the two recesses is used. Thus the cover is operable to three positions, in two of which the cover is closed and in the other of which the cover is open to permit filling or dispensing. A hub 27 is formed axially on the main cover 13, in axial alignment with the pivot 11 and rotatably receives the spinner 28 which is provided with a knob 29 at its upper end for manual operation, and has a clutch slot 30 at its lower end for cooperation with the key 31 formed at the upper end of the pivot 11, the spinner 28 being removable and replaceable at will.

Mounted within the lower portion of the motor housing 21 is a pair of meshing gears 32 and 33, one of which is driven by the motor shaft 34. The agitator or beater shafts 35 and 36 are fixed in these gears and are provided with suitable blades or vanes 37, with the blades of one of these beaters closely approaching the wall of the container 10.

A depending bracket 38 is attached to or formed integral with the bracket 12 and supports a motor 39 beneath the container 10, and a fan 40 is mounted on the motor shaft. This motor 39 is controlled by the switch 22, while the motor 21 is controlled by the switch 23.

This apparatus may be mounted in a specially built refrigerating cabinet, or may be installed in the conventional ice cream cabinet having a refrigerating unit 45, in which case the base 13 of the apparatus functions as the cover for the specific compartment of the cabinet in which it is installed. The cabinet 15 is maintained at a suitable temperature by means of the conventional refrigerating unit which is not shown because it is well known in the art.

When ice cream is to be converted from the stiffly-frozen state to a semi-frozen or soft condition, or when a batch of semi-frozen malted milk or other confection is to be prepared, the cover 18 is swung open and a batch of the stiffly-frozen ice cream, or the ingredients to be used to make the semi-frozen malted milk or other confection, is placed in the container 10 through the opening 17. The cover 18 is then closed with the button 26 seated in the recess 25, which causes the cover to cooperate with and depress the button 44 of the switch 23 and thus close the switch, which through a conductive circuit passing through the conduit 41, closes the circuit to the motor 21, starting operation of the beaters 35—36—37, such circuits being well known in the art and therefore requiring no detailed description. The tendency of these beaters is to cause the container to rotate on its axis, but when a fresh supply of frozen material is placed in the container, the resistance against rotation exerted by the stiffly-frozen material prevents this rotation. For this reason the spinner 28—29 together with the plain shaft coupling 30—31 is provided. This spinner is inserted through the passage in the hub 27 when the operation is started and is manually twisted by means of the knob 29 in the normal direction of rotation of the container until the beaters cut through the mass of stiffly-frozen material, after which the beaters will continue the rotation of the container and the spinner can be removed.

The beaters are permitted to operate until the contents are converted into a smooth, semi-liquid mass, after which the cover 18 is moved slightly with the button 26 changing from the recess 25 to recess 24. This movement releases the switch 23 to open or break the circuit to the motor 21, terminating operation of the beaters.

As is well known, unless there is disturbance within the refrigerating cabinet, air in the lower portion of the cabinet will be considerably colder than that in the upper portion. Thermostatic control for the product is impractical because there is no change in temperature through the semi-frozen stage, consequently manual control is used for maintaining the semi-frozen condition of the product. If the product becomes a little too soft, the cover 18 is again closed against the switch 23, with the button 26 in the recess 25, starting operation of the beaters. The switch 22 is then closed, completing circuit to the motor 39 which drives the fan 40 which draws the cold air from the lower portion of the cabinet and circulates it about the container, starting a freezing action to thicken the product. When the product is sufficiently thickened, the switch 22 is manually snapped to open-circuit position to stop the motor 39, and the cover 18 is moved back to its circuit breaking position, stopping the motor 21. As will be noted, the beaters cannot be operated when the cover 18 is open unless the switch 23 is manually closed and held closed.

The beaters are preferably provided with non-circular shafts as illustrated in Fig. 5. With a non-circular shaft, a circular recess 42 is formed in the material surrounding the shaft, and air, as indicated by the arrow 43, passes down through this recess and is then forced through the product making the product light and fluffy and extremely palatable and delicious and increasing its bulk.

Obviously, for circulating the cold from the lower portion of the cabinet, a liquid with a suitably circulating pump could be substituted for the fan, but is not shown because it is less desirable, requiring more space, and not being so efficiently controlled, and also, the installation would prove more costly. Fins on the outer walls of the container were given consideration but are impractical because their action cannot be stopped, and during the conversion process from solid to semi-fluid, there must be no stirring of the air within the cabinet, as the container during this period must be subjected to the warmer air in the upper zone of the refrigerated space. When the product is to be decreased in fluidity, the fan is operated to supply the cold air from the lower zone to slightly increase the degree of freezing. Without this fan the product cannot be maintained in the proper semi-frozen condition. The temperature of the cabinet is thermostatically regulated for a freezing temperature in the lower portion only under static conditions. Only by selective utilization of the variations in temperatures between the upper and lower zones of the refrigerated space can a uniform product be attained and maintained.

I claim:

1. Apparatus for making semi-frozen confections comprising; a container rotatably supported on a vertical axis; a main cover for said container and isolated therefrom for free rotative movement of the container relative to said cover; a plurality of beaters projecting downwardly into said container, and means supported by said main cover for driving and suspendedly supporting said beaters; said beaters functioning to cause rotation of said container through cooperation with the material within the container during the beating operation; manually operable means for controlling operation of said beaters; fluid circulating means and driving means therefor mounted below said container, and manual control means for said driving means; said apparatus being mountable in a refrigerated space; said fluid circulating means operating to force cold fluid from the lower zone of the refrigerated space into heat transfer relation to said container, to increase the degree of freezing of the material within the container at will.

2. Apparatus for making semi-frozen confections comprising; a container rotatably supported on a vertical axis; a main cover for said container and isolated therefrom for free rotative movement of the container relative to said cover; a plurality of beaters projecting downwardly into said container, and means supported by said main cover for driving and suspendedly supporting said beaters; said beaters functioning to cause rotation of said container through cooperation with the material within the container during the beating operation; manually operable means for controlling operation of said beaters; a bracket for supporting said container; a fan and driving means therefor supported by said bracket below said container for circulating cold air from the lower portion of a refrigerated space in which the apparatus is mounted, about the container to increase the chilling action on the material within the container.

3. Apparatus for making semi-frozen confections comprising; a container rotatably supported on a vertical axis; a main cover for said container and isolated therefrom for free rotative movement of the container relative to said cover; a plurality of beaters projecting downwardly into said container, and means supported by said main cover for driving and suspendedly supporting said beaters; said beaters functioning to cause rotation of said container through cooperation with the material within the container during the beating operation; manually operable means for controlling operation of said beaters; said beaters having shafts angular in cross-section to form an air recess during operation about the shafts and extending downwardly into the material for introduction of air into the material during the beating operation.

4. Apparatus for making a semi-frozen confection comprising; a main cover for a refrigerating cabinet; a depending support supported within the cabinet; a container supported by said support on a vertical axis for free rotation; a fan and driving means therefor carried by said support beneath said container for circulating cold air from the lower portion of the cabinet and about said container for reducing the temperature thereof, and manual control means for said driving means; a plurality of beaters projecting down into said container, and supporting and driving means therefor mounted on said cover and including a motor and a circuit; a switch mounted on said main cover and controlling operation of said motor; an opening formed through said main cover and a container cover mounted on said main cover and manually operable to three positions in two of which the container cover closes said opening and in the other of which the opening is open; releasable retaining means for retaining said container cover selectively in either of said two positions, in one of which said container cover closes said switch for operation of said motor, and in the other of which as also in the third or open position, said container cover releases said switch to open for non-operation of said motor.

KENNETH E. BEMIS.